(12) United States Patent
Otsuki

(10) Patent No.: US 9,212,972 B2
(45) Date of Patent: Dec. 15, 2015

(54) CHASSIS DYNAMOMETER AND METHOD OF OPENING AND CLOSING A ROLLER OPENING OF CHASSIS DYNAMOMETER

(71) Applicant: MEIDENSHA CORPORATION, Tokyo (JP)

(72) Inventor: Kazuhisa Otsuki, Gunma (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 14/384,091

(22) PCT Filed: Feb. 25, 2013

(86) PCT No.: PCT/JP2013/054814
§ 371 (c)(1),
(2) Date: Sep. 9, 2014

(87) PCT Pub. No.: WO2013/140956
PCT Pub. Date: Sep. 26, 2013

(65) Prior Publication Data
US 2015/0040655 A1    Feb. 12, 2015

(30) Foreign Application Priority Data

Mar. 23, 2012 (JP) .................. 2012-066477

(51) Int. Cl.
*G01M 17/007* (2006.01)
(52) U.S. Cl.
CPC ...... *G01M 17/0072* (2013.01); *G01M 17/0074* (2013.01)

(58) Field of Classification Search
CPC .......... G01M 17/045; G01M 17/0072; G01M 17/0074; G01L 5/282; G01L 3/24; G01L 5/288
USPC ....................................... 73/116.06
See application file for complete search history.

(56) References Cited

U.S. PATENT DOCUMENTS

| 4,635,472 | A | * | 1/1987 | Scourtes | 73/116.06 |
| 4,953,391 | A | * | 9/1990 | Schober et al. | 73/116.07 |
| 6,457,351 | B1 | * | 10/2002 | Yamamoto | 73/116.05 |
| 6,457,352 | B1 | * | 10/2002 | Knestel | 73/117.03 |

(Continued)

FOREIGN PATENT DOCUMENTS

| JP | 61-065133 A | 4/1986 |
| JP | 8-152380 A | 6/1996 |

(Continued)

OTHER PUBLICATIONS

Korean Office Action Jan. 27, 2015, 4 pages.

*Primary Examiner* — Freddie Kirkland, III
(74) *Attorney, Agent, or Firm* — Foley & Lardner LLP

(57) ABSTRACT

In a conventional chassis dynamometer, when a roller opening formed in a pit cover is closed by an open/close plate, the open/close plate is projected from an upper surface of the pit cover so that irregularities are generated on the upper surface of the pit cover. A chassis dynamometer 1 includes rollers 2, 3 on which wheels of a test vehicle are rested through roller openings 6, 7 formed in a pit cover 5, and an opening open/close mechanism 15 that opens and closes the roller openings 6, 7. The rollers 2, 3 are ascendably and descendably operated by a roller ascent/descent operation mechanism 8. The rollers 2, 3 are operated to descend, and the roller openings 6, 7 are closed by open/close plates 16.

8 Claims, 5 Drawing Sheets

(56) References Cited

U.S. PATENT DOCUMENTS 7,493,805 B2 * 2/2009 Ben-David ............. 73/117.02
7,584,654 B2 * 9/2009 Seibl ..................... 73/123
8,302,468 B2 * 11/2012 Evers ..................... 73/116.06
8,322,554 B2 * 12/2012 Takamori et al. ....... 220/252
8,505,374 B1 * 8/2013 Arseneau ............... 73/116.05

FOREIGN PATENT DOCUMENTS

| JP | 10-142108 | 5/1998 |
| JP | 2002-181667 | 6/2002 |
| JP | 2010-025654 A | 2/2010 |
| JP | 2010-096611 A | 4/2010 |
| WO | WO 2007/055339 A1 | 5/2007 |

* cited by examiner

CHASSIS DYNAMOMETER AND METHOD OF OPENING AND CLOSING A ROLLER OPENING OF CHASSIS DYNAMOMETER

TECHNICAL FIELD

The present invention relates to a chassis dynamometer having rollers on which driving wheels of a test vehicle are rested and rotated to simulate running of the test vehicle on a road in a room, and a method of opening and closing a roller opening of the chassis dynamometer.

BACKGROUND ART

As shown in FIG. 8, there has been proposed a chassis dynamometer including a pit cover 104 provided with a roller opening 103 for resting a wheel 101 of a test vehicle (not shown) on a roller 102 of a test vehicle (not shown), and an opening open/close plate 105 that is operated to open and close the roller opening 103. Further, reference signs 106, 107 denote a rack and a pinion which cooperate to move the opening open/close plate 105. (For instance, see Patent Literatures 1, 2).

Patent Literature 1: Japanese Patent Application Unexamined Publication No. 2010-25654
Patent Literature 2: Japanese Patent Application Unexamined Publication No. 2002-181667

SUMMARY OF THE INVENTION

Technical Problem

In the above-described chassis dynamometer, a height position H1 of an upper end portion 102a on an outer peripheral surface of the roller 102 is set so as to be substantially flush with a height position H2 of an upper surface of the pit cover 104. Therefore, there are the following problems.

(1) Upon closing the roller opening 103 by the opening open/close plate 105, a height position H3 of the opening open/close plate 105 must be higher than the height position of the roller 102 and the height position of the pit cover 104 in order to avoid contact between the opening open/close plate 105 and the upper end portion 102a on the outer peripheral surface of the roller 102.

(2) When the height position H3 of the opening open/close plate 105 is higher than the height position of the upper surface of the pit cover 104, the opening open/close plate 105 is projected from the upper surface of the pit cover 104. As a result, in a case where a person is worked on the pit cover 104 in a closed state of the opening open/close plate 105, the person may stumble on a portion projecting from the upper surface of the pit cover 104. Further, in a case where the test vehicle is moved onto the dynamometer, particularly, when the test vehicle is transported onto the dynamometer by a human power upon a cold start test, etc., the projecting portion will cause large obstruction.

(3) In a case where an RF anechoic chamber is provided on the pit cover 104 and the test vehicle is subjected to a radio wave irradiation test and measurement of radiation noise within the RF anechoic chamber in a state in which the roller opening 103 is closed by the opening open/close plate 105, if the opening open/close plate 105 is projected from the upper surface of the pit cover 104, there will occur disturbance of the radio wave reflection on the upper surface of the pit cover 104 and adverse influence will be exerted on accuracy of the measurement or the like.

The present invention has been made in order to provide a chassis dynamometer capable of preventing an opening open/close plate from projecting on a pit cover even when the roller opening is closed by the opening open/close plate, and a method of opening and closing a roller opening of the chassis dynamometer.

Solution to Problem

According to a first aspect of the present invention, there is provided a chassis dynamometer including:
a roller on which a wheel of a test vehicle is rested through a roller opening formed in a pit cover;
a roller opening open/close mechanism that opens and closes the roller opening; and
a roller ascent/descent operation mechanism that operates the roller to ascend and descend,
wherein the roller opening open/close mechanism comprises a roller opening open/close plate that is overlaid on a side of a lower surface of the pit cover and operated to open and close the roller opening, an open/close plate driving section that moves the roller opening open/close date to a roller opening closed position or a roller opening opened position, an open/close plate supporting guide that guides the roller opening open/close plate and supports the roller opening open/close plate in a height position of the pit cover in the roller opening closed position.

According to a second aspect of the present invention, there is provided the chassis dynamometer as described in the first aspect, further including: an engine cooling device including an engine cooling fan disposed in a pit below the pit cover, a ventilation duct that introduces an air flow generated by the engine cooling fan into the test vehicle on the pit cover through a duct opening formed in the pit cover, and a duct ascent/descent mechanism that allows the ventilation duct to expand and retract, and ascend and descend; and a duct opening open/close plate that closes the duct opening in a state in which the ventilation duct is accommodated in the pit using the duct ascent/descent mechanism.

According to a third aspect of the present invention, there is provided the chassis dynamometer as described in the first aspect, wherein the roller ascent/descent operation mechanism comprises a bed on which the roller is mounted, an inclined rail that supports the bed such that the bed is ascendable and descendable, and a bed driving section that allows the bed to run along the inclined rail.

According to a fourth aspect of the present invention, there is provided the chassis dynamometer as described in the third aspect, wherein the bed driving section includes a motor, a feed screw that is rotationally driven by the motor, and a feed nut that converts rotation of the feed screw into slide motion of the bed.

According to a fifth aspect of the present invention, there is provided the chassis dynamometer as described in the fourth aspect, wherein the roller ascent/descent operation mechanism includes a clamp mechanism that fixes the bed on a side of the inclined rail.

According to a sixth aspect of the present invention, there is provided the chassis dynamometer as described in the fifth aspect, wherein the clamp mechanism includes a brake pad disposed on one of the bed and the inclined rail, and a brake plate disposed on the other of the bed and the inclined rail, the brake pad being pressed against the brake plate.

According to a seventh aspect of the present invention, there is provided the chassis dynamometer as described in any one of the first to sixth aspects, wherein the pit cover is provided with an RF anechoic chamber in a test vehicle introducing position in which the roller opening is located.

According to an eighth aspect of the present invention, there is provided a method of opening and closing a roller opening of a chassis dynamometer using a roller on which a wheel of a test vehicle is rested through a roller opening formed in a pit cover, a roller opening open/close mechanism that opens and closes the roller opening by a roller opening open/close plate, and a roller ascent/descent operation mechanism that operates the roller to ascend and descend, the method including:

overlaying the roller opening open/close plate on a side of a lower surface of the pit cover, and sliding the roller opening open/close plate to close the roller opening in a height position of the pit cover by the roller opening open/close plate; and upon using the roller, sliding the roller opening open/close plate to open the roller opening, and ascending the roller to the height position of the pit cover by the roller ascent/descent operation mechanism.

Advantageous Effects of Invention

In the chassis dynamometer as described in the first aspect, when the roller opening is in the closed state, the roller opening open/close plate is supported to be flush with the upper surface of the pit cover by the open/close plate supporting guide. Therefore, the roller opening open/close plate is prevented from projecting from the upper surface of the pit cover. Accordingly, a person, for instance, a worker can be prevented from stumbling on a portion projecting from the upper surface of the pit cover and falling down. Further, in a case where the test vehicle is moved onto the dynamometer, particularly, when the test vehicle is transported onto the dynamometer by a human power upon a cold start test, etc., it is possible to suppress occurrence of large obstruction which is formed by the projecting portion. Further, in a case where an RF anechoic chamber is provided on the pit cover and the test vehicle is subjected to a radio wave irradiation test and measurement of radiation noise within the RF anechoic chamber in a state in which the roller opening is closed by the opening open/close plate, it is possible to suppress occurrence of disturbance of the radio wave reflection on the upper surface of the pit cover and adverse influence on accuracy of the measurement or the like which are caused when the opening open/close plate is projected from the upper surface of the pit cover.

Further, when the roller opening open/close plate is moved in a direction in which the roller opening is opened, the roller opening open/close plate is released from support by the open/close plate supporting guide and suspended in the pit to thereby open the roller opening. Then, the roller can be operated to ascend to a same height as that of the pit cover by the roller ascent/descent operation mechanism.

In the chassis dynamometer as described in the second aspect, when the wheel of the test vehicle is rested on the roller and the test is carried out, the ventilation duct is allowed to expand and ascend in an upward-downward direction and project onto the pit cover such that an air flow generated by the engine cooling fan is hit on the engine of the test vehicle and the test is carried out while cooling the engine. After completion of cooling, the ventilation duct is allowed to retract and descend in the upward-downward direction. After the ventilation duct is accommodated in the pit, the duct opening can be closed by the duct opening open/close plate.

In the chassis dynamometer as described in the third aspect, the bed on which the roller is mounted is allowed to run along the inclined rail. With this construction, it is possible to appropriately set an inclination angle of the rail. For instance, by setting the inclination angle to a small degree, the heavy bed on which the roller is mounted can be allowed to smoothly ascend and descend by a relatively small force.

In the chassis dynamometer as described in the fourth aspect, the feed screw that constitutes a bed slide driving mechanism is arranged in parallel with the inclined rail, and the feed screw is rotated by the motor. With this construction, it is possible to smoothly slidably move the bed along the rail.

In the chassis dynamometer as described in the fifth aspect, there is provided the clamp mechanism that fixes the bed on the side of the inclined rail. With this construction, it is possible to suppress occurrence of misalignment of the roller which is caused by movement of the bed due to vibration, etc. generated during rotation of the roller.

In the chassis dynamometer as described in the sixth aspect, the clamp mechanism includes the brake pad disposed on one of the bed and the inclined rail, and the brake plate disposed on the other of the bed and the inclined rail, the brake pad being pressed against the brake plate. With this construction, after moving the bed to a predetermined position, the bed can be fixed to the predetermined position by pressing the brake pad onto the brake plate to thereby generate a frictional force therebetween.

In the chassis dynamometer as described in the seventh aspect, in a case where the test vehicle is subjected to a radio wave irradiation test and measurement of radiation noise within the RF anechoic chamber on the pit cover, the roller opening and the duct opening for the engine cooling fan are closed by the roller opening open/close plate, so that the roller can be prevented from giving adverse influence on the radio wave irradiation test and the measurement of radiation noise.

Particularly, by descending the roller by the roller ascent/descent operation device, the roller opening open/close plate can be flush with the upper surface of the pit cover. Therefore, it is possible to suppress disturbance of radio wave reflection which has been conventionally caused due to the open/close plate projecting from the upper surface of the pit cover. As a result, it is possible to subject the test vehicle to the radio wave irradiation test and the measurement of radiation noise within the RF anechoic chamber with high accuracy.

In the method of opening and closing a roller opening of a chassis dynamometer as described in the eighth aspect, in a state in which the roller opening is opened, a position of the roller is ascended to a same height position as that of the pit cover so that the test vehicle can be readily loaded on the roller. Further, after completion of the test, the height position of the roller is descended by the roller ascent/descent operation device, so that the roller opening can be closed in such a manner that the roller is prevented from disturbing the roller opening open/close plate upon closing the roller opening.

DESCRIPTION OF EMBODIMENTS

FIG. 1 to FIG. 5 show a first embodiment of the present invention. FIG. 1 is a side view of a chassis dynamometer 1. Disposed within a pit P are a front-wheel roller 2 on which front wheels of a test vehicle are rested, and a rear-wheel roller 3 on which rear wheels of the test vehicle are rested. A rotation shaft 4 of the front-wheel roller 2 and a rotation shaft 4 of the rear-wheel roller 3 are connected to a dynamometer main body (not shown).

An upper end of the front-wheel roller 2 and an upper end of the rear-wheel roller 3 are exposed to roller openings (hereinafter referred to simply as openings) 6, 7 formed in a pit cover 5. Further, the front wheels and the rear wheels of the test vehicle are respectively rested on the front-wheel roller 2 and the rear-wheel roller 3 through the openings 6, 7.

The front-wheel roller 2 and the rear-wheel roller 3 are operated to ascend and descend by a roller ascent/descent operation mechanism 8, respectively.

The roller ascent/descent operation mechanism 8 includes a bed 9 on which the front-wheel roller 2 or the rear-wheel roller 3 is mounted, an inclined rail 10 on which the bed 9 is slidably supported, and a bed driving section 11 that allows the bed 9 to run along the inclined rail 10. The inclined rail 10 is formed to have a slope with a desired inclination angle θ, for instance 5 degrees. As shown in FIG. 5, the rail 10 includes a rail main body portion 10a and a rail platform 10b to which the rail main body portion 10a is attached.

The bed driving section 11 includes a motor (not shown), a feed screw 13 that is rotationally driven by a gearbox 12, and a feed nut 14 that converts rotational motion of the feed screw 13 into linear motion of the bed 9. The feed screw 13 is arranged along the inclined rail 10.

Next, an opening open/close mechanism 15 that opens and closes the opening 6 or 7 is explained.

As shown in FIG. 2 to FIG. 4 in enlarged views, the opening open/close mechanism 15 includes a roller opening open/close plate (hereinafter referred to simply as an open/close plate) 16 that is operated to open and close the opening 6 or 7, an open/close plate driving section 17 that moves the roller opening open/close plate 16 between a roller opening closed position and a roller opening opened position (hereinafter referred to simply as a closed position and an opened position), and an open/close plate supporting guide 18 that guides the open/close plate 16 to the closed position and the opened position. In the opened position, the open/close plate supporting guide 18 is allowed to suspend the open/close plate 16 in the pit P. In the closed position, the open/close plate supporting guide 18 supports the open/close plate 16 in a state in which the open/close plate 16 is flush with an upper surface of the pit cover 5.

The open/close plate 16 is formed into a foldable belt conveyer shape by connecting both sides of multiple plate members 16a disposed parallel to each other through a pair of chain-shaped connecting members. Further, the open/close plate driving section 17 includes a geared motor, and feeds the open/close plate 16 having the belt conveyer shape. Although the opening open/close mechanism 15 on a front-wheel side is explained with reference to FIG. 1 to FIG. 4, the opening open/close mechanism on a rear-wheel side has a construction similar to that of the opening open/close mechanism 15 on the front-wheel side.

As shown in FIG. 1, an RF anechoic chamber 19 including the openings 6, 7 is formed on the pit cover 5. In the RF anechoic chamber 19, a radio wave irradiation test and measurement of radiation noise relative to the test vehicle are carried out.

Further, a tire cooling fan 20 is mounted on the bed 9. A ventilating duct 20a of the tire cooling fan 20 has a tip end directed to the opening 6, 7. When the opening 6, 7 is closed by the open/close plate 16, the tip end of the ventilating duct 20a is covered together with the roller with the open/close plate 16.

The rear-wheel roller 3, the roller ascent/descent operation mechanism 8, the tire cooling fan 20, etc. are mounted on a slide table 21 that is moveable in a forward-rearward direction of the test vehicle. The slide table 21 is driven by a slide table driving mechanism 22.

The slide table driving mechanism 22 is includes a motor (not shown), a feed screw 24 that is rotationally driven by a gearbox 23, and a feed nut 25 that covers rotational motion of the feed screw 24 into linear motion of the slide table 21.

When the motor is rotated in one of clockwise and counterclockwise directions, the rear-wheel roller 3 is moved in a direction in which a distance from the front-wheel roller 2 is increased. When the motor is rotated in an inverse direction, the rear-wheel roller 3 is moved in a direction in which a distance from the front-wheel roller 2 is decreased. Reference signs 26, 27 denote moveable pit covers that move to follow the movement of the rear-wheel roller 3.

FIG. 5 shows a clamp mechanism for fixing the bed 9 to a side of the rail 10. In the case where the feed screw 13 is used in the bed driving section 11 as described above, there inevitably occurs a slight clearance, i.e., a so-called backlash between the feed screw 13 and the feed nut 14. Therefore, there is a fear that the bed 9 is moved due to vibration generated during rotation of the rollers 2, 3, whereby misalignment of the respective rollers 2, 3 is caused.

The clamp mechanism 31 acts to suppress the misalignment of the roller by fixing the bed 9 to the side of the rail 10. The clamp mechanism 31 includes a brake pad 32 and a brake plate 33 against which the brake pad 32 is pressed.

The brake pad 32 is attached to one side portion of the bed 9 to which the roller 3 is mounted, through a holder 34. The brake plate 33 is mounted to a side portion of the inclined rail 10 along the slope of the rail 10 through a holder 35.

Further, after each roller 2, 3 is moved to a predetermined position by means of the feed screw 13, the brake pad 32 is pressed against the brake plate 33 so that the bed 9 is fixed to a given position on the side of the rail 10. As a result, the rollers 2, 3 can be prevented from being misaligned, respectively.

The brake plate 33 extends along the rail 10 and has substantially the same length as that of the rail 10. A plurality of brake pads 32 are disposed along the length direction of the brake plate 33 and ensure positioning of the beds 9 and the rollers 2, 3 and fix the beds 9 and the rollers 2, 3 at desired positions. In the above embodiment, the brake pads 32 are disposed on the side of the bed 9, and the brake plate 33 is disposed on the side of the rail 10. However, contrary to this arrangement, the brake pads 32 may be disposed on the side of the rail 10, and the brake plate 33 may be disposed on the side of the bed 9. Further, in the above embodiment, the brake pads 32 and the brake plate 33 are used in the clamp mechanism 31. However, the clamp mechanism 31 is not limited to the above embodiment as long as the bed 9 is surely fixed to the side of the rail 10.

Next, an operation of the chassis dynamometer 1 according to the first embodiment is explained. In a case where various kinds of running tests of a test vehicle are carried out, the slide table 21 is slid corresponding to a distance between the front wheels and the rear wheels of the test vehicle such that the rear-wheel roller 3 is moved to a predetermined position. After that, the front wheels and the rear wheels of the test vehicle are set on the front-wheel roller 2 and the rear-wheel roller 3, respectively.

Then, the bed 9 is fixed to the side of the rail 10 by the clamp mechanism 31 so as to suppress displacement of the bed 9, and the roller 3 is rotated to thereby carry out the various kinds of running tests of the test vehicle.

Upon closing the openings 6, 7 after completion of the running tests, firstly the front-wheel roller 2 and the rear-wheel roller 3 are descended by the roller ascent/descent operation mechanism 8.

The front-wheel roller 2 and the rear-wheel roller 3 are descended to a position in which the front-wheel roller 2 and rear-wheel roller 3 are free from interference with the open/ close plates 16. After that, the open/close plates 16 are each moved toward the side of the openings 6, 7 by the open/close plate driving section 17 of the opening open/close mechanism 15.

The open/close plates 16 thus moved are guided by the open/close plate supporting guide 18, and at the openings 6, 7, the open/close plates 16 become flush with the upper surface of the pit cover 5 to close the roller openings 6, 7.

Accordingly, the open/close plates 16 fed are prevented from projecting from the upper surface of the pit cover 5 as described in the problem of the conventional art, so that the test vehicle can be smoothly transported onto the pit cover 5. In addition, the open/close plates are brought into a state in which the open/close plates are flush with the upper surface of the pit cover. Therefore, in a case where the test vehicle is subjected to a radio wave irradiation test and measurement of radiation noise within the RF anechoic chamber 19, it is possible to suppress disturbance of the radio wave reflection which is caused due to projection of the open/close plates 16 from the upper surface of the pit cover 5. As a result, it is possible to perform the radio wave irradiation test and the measurement of radiation noise within the RF anechoic chamber with high accuracy.

FIG. 6 and FIG. 7 show a second embodiment of the present invention. The second embodiment has the same basic construction as that of the above first embodiment. A main difference between a chassis dynamometer 1A according to the second embodiment and the chassis dynamometer 1 according to the first embodiment resides in that the chassis dynamometer 1A according to the second embodiment includes an engine cooling device 41 for cooling an engine of the test vehicle. Since other parts are same as those of the first embodiment, like reference signs denote like parts, and therefore, detailed explanations therefor are omitted.

The engine cooling device 41 includes an engine cooling fan 42 disposed within the pit P, a ventilation duct 43 introducing an air flow generated by the engine cooling fan 42 into the test vehicle on the pit cover 5 through a duct opening 5a formed in the pit cover 5, and a duct ascent/descent mechanism 44 that allows the ventilation duct 43 to ascend or descend.

The duct ascent/descent mechanism 44 allows the ventilation duct 43 to ascend and project from the pit cover 5 through the duct opening 5a. The duct ascent/descent mechanism 44 also allows the ventilation duct 43 to descend and accommodate the ventilation duct 43 in the pit P. The duct ascent/descent mechanism 44 includes an electric jack or the like.

The duct opening 5a is opened and closed by a duct opening open/close plate 45. Similarly to the open/close plate 16 for the roller opening, the duct opening open/close plate 45 is formed into a foldable belt conveyer shape by connecting both sides of multiple plate members disposed parallel to each other through a pair of chain-shaped connecting members.

The duct opening open/close plate 45 is operated to move between a duct opening closed position and a duct opening opened position by an open/close plate driving section that employs the geared motor 46 and has the same construction as that of the open/close plate driving section 17, and an open/close plate supporting guide having the same construction as that of the open/close plate supporting guide 18. In the duct opening opened position as shown in FIG. 6, the duct opening open/close plate 45 is vertically suspended in the pit P. In the duct opening closed position as shown in FIG. 7, the duct opening open/close plate 45 is flush with the upper surface of the pit cover 5 and covers the duct opening 5a.

In the chassis dynamometer 1A according to the second embodiment, the engine cooling fan 42 for cooling the engine of the test vehicle is disposed within the pit P and the air flow generated by the engine cooling fan 42 is hit on the engine of the test vehicle on the pit cover 5 through the duct 43. With this construction, it is not necessary to ensure a space on the pit cover 5 in which the engine cooling fan 42 is installed. Further, it is possible to prevent the engine cooling fan 42 from disturbing the test vehicle upon loading and unloading the test vehicle.

Further, in a case where it becomes unnecessary to cool the test vehicle, the duct 43 is retracted and accommodated within the pit P, and the duct opening 5a is closed by the duct opening open/close plate 45 so that the duct opening open/close plate 45 is brought into a state in which the duct opening open/close plate 45 is flush with the upper surface of the pit cover 5. Therefore, it is possible to prevent the duct opening open/close plate 45 from projecting from the upper surface of the pit cover 5 and disturbing loading and unloading of the test vehicle.

In addition, also in a case where the test vehicle is subjected to a radio wave irradiation test and measurement of radiation noise within the RF anechoic chamber 19 formed on the pit cover 5, it is possible to suppress disturbance of the radio wave reflection which is caused due to projection of the duct opening open/close plates 45 from the upper surface of the pit cover 5. As a result, it is possible to perform the radio wave irradiation test and the measurement of radiation noise within the RF anechoic chamber 19 with high accuracy. Furthermore, since the upper surface of the pit cover 5 can be fully flattened, it is possible to readily carry the test vehicle into the RF anechoic chamber 19 by a human power upon carrying out a cold start test.

Further, although in the above embodiments, the front-wheel roller 2 and the rear-wheel roller 3 are operated to gradually ascend and descend while slantingly running along the inclined rail 10, the front-wheel roller 2 and the rear-wheel roller 3 may be operated to ascend and descend in a vertical direction. Furthermore, although in the above embodiments, the bed driving section 11 of the roller ascent/descent operation mechanism 8 includes the feed screw 13 and the feed nut 14, the bed driving section 11 may include a hydraulic cylinder, a rack and pinion assembly, a hydraulic jack, etc.

Figure 1:
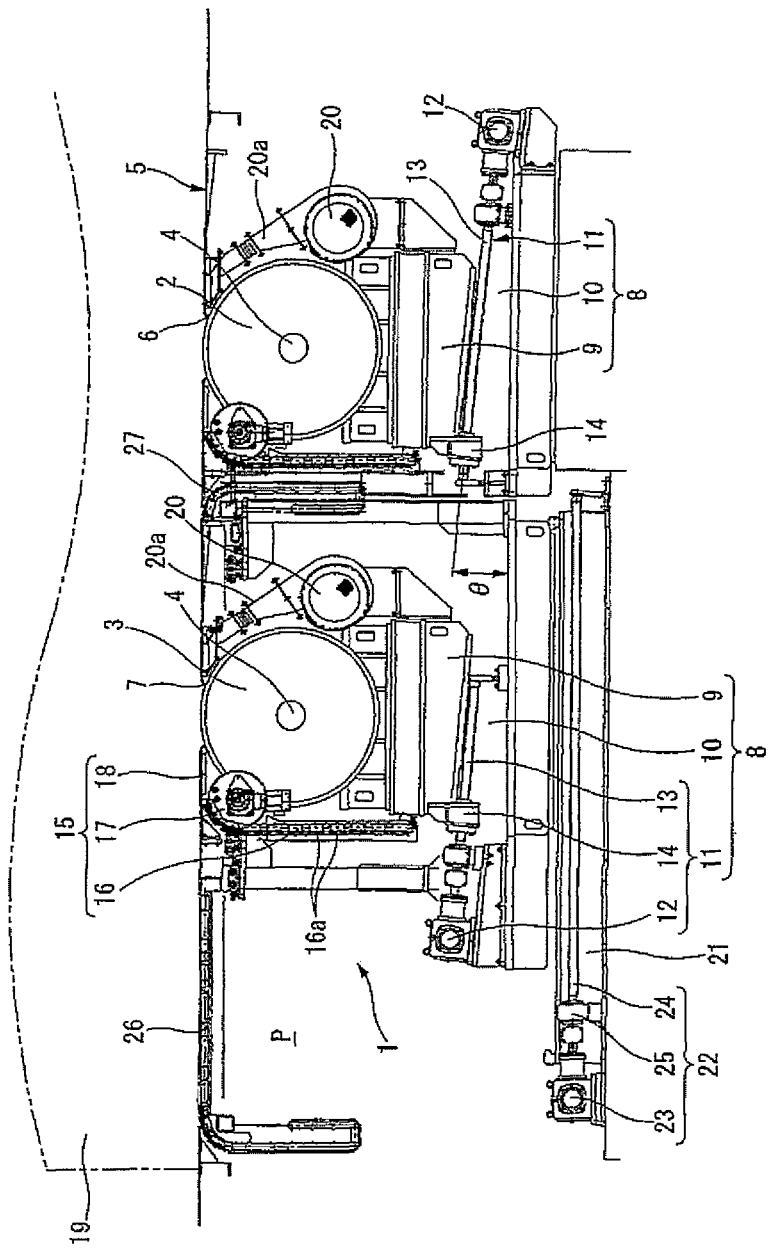
FIG. 1 is a side view showing the whole of a chassis dynamometer according to a first embodiment of the present invention.
Figure 2:
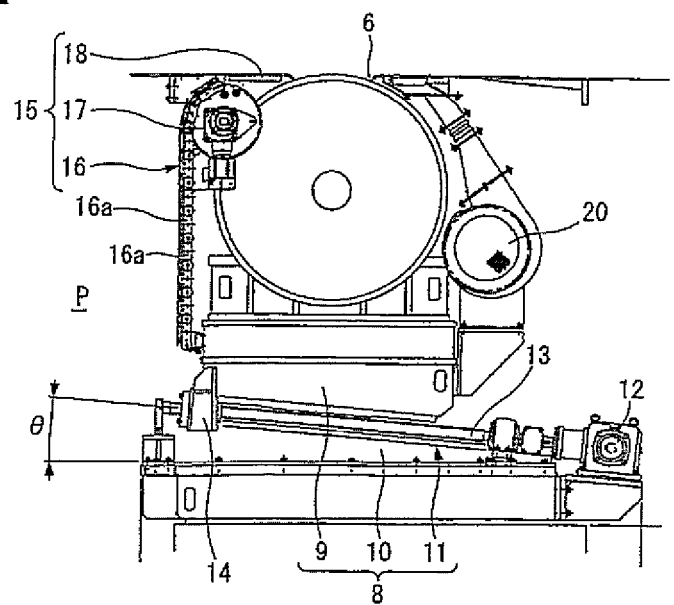
FIG. 2 is an enlarged side view showing a roller portion in a roller ascended state.
Figure 3:
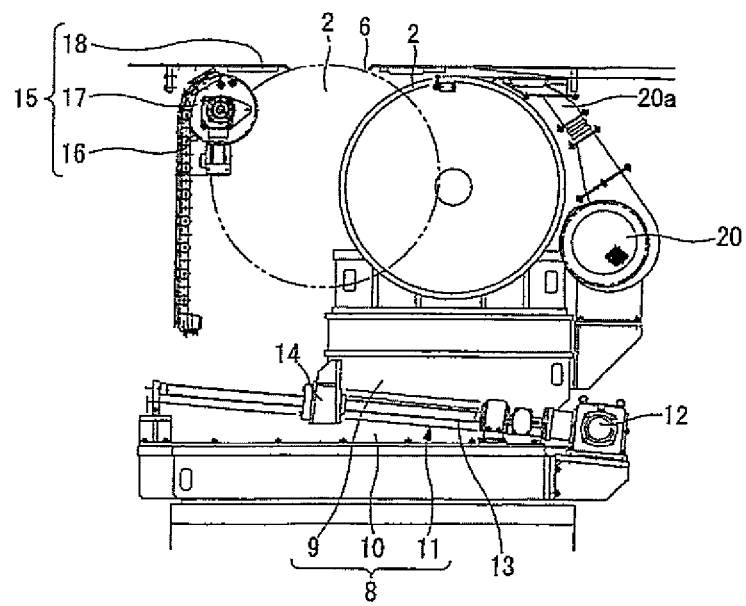
FIG. 3 is an enlarged side view showing a roller portion in a roller descended state.
Figure 4:
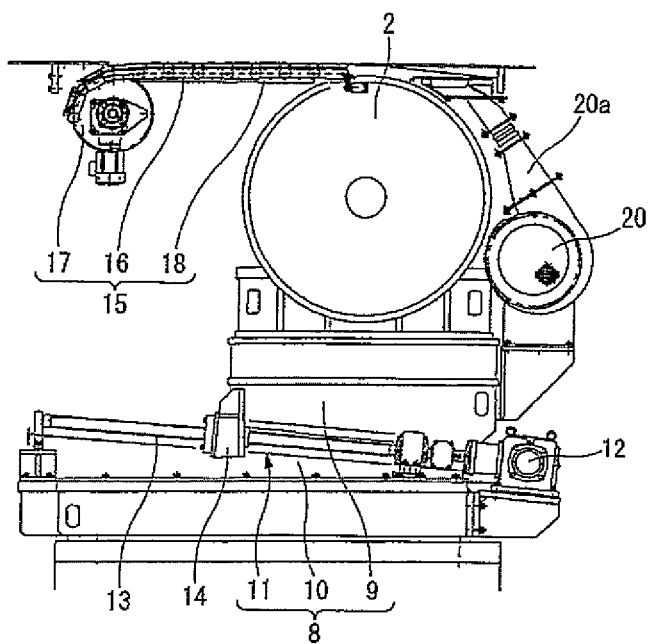
FIG. 4 is a side view showing a state in which an open/close plate is closed.
Figure 5:
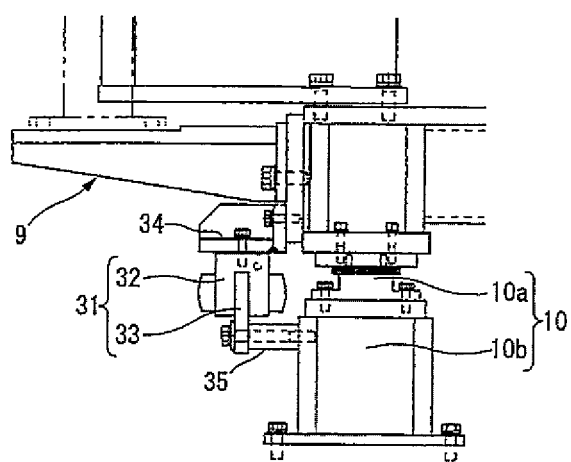
FIG. 5 is a schematically explanatory diagram showing a clamp mechanism of a roller.
Figure 6:
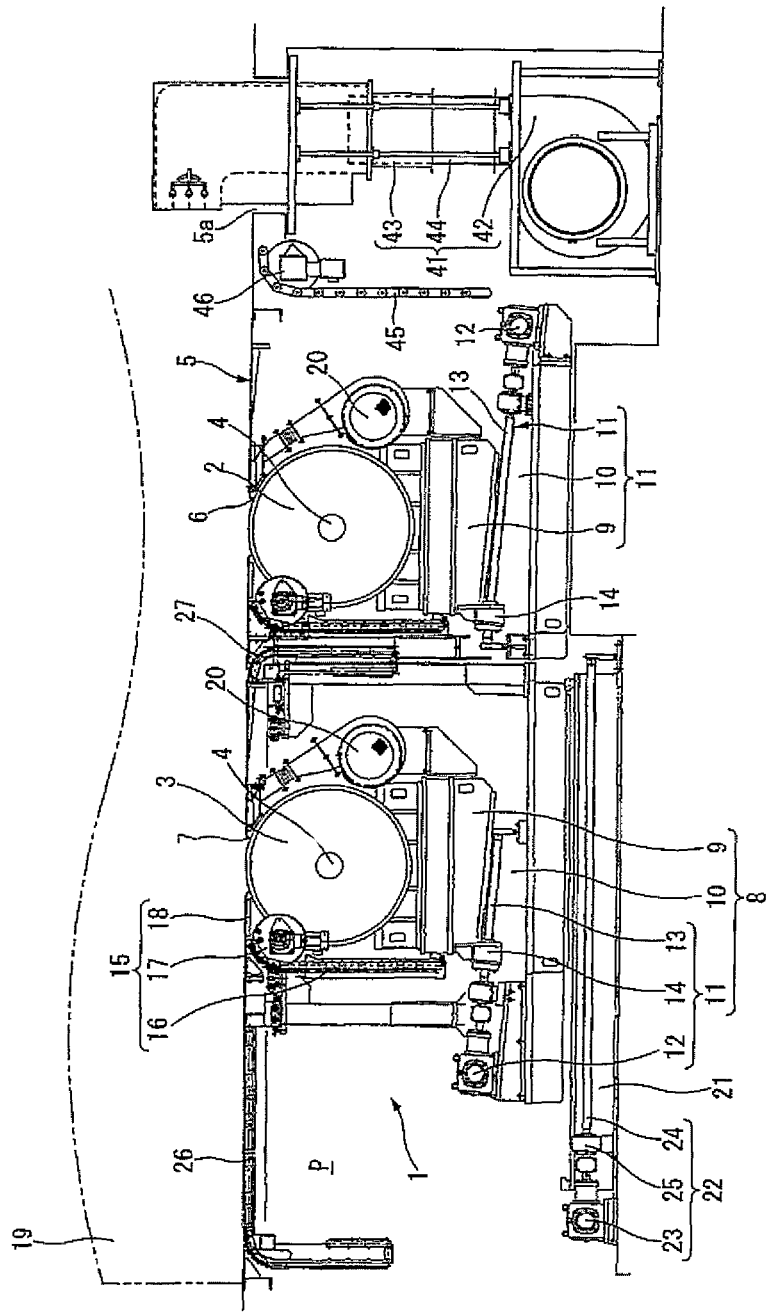
FIG. 6 is a side view showing a chassis dynamometer according to a second embodiment of the present invention.
Figure 7:
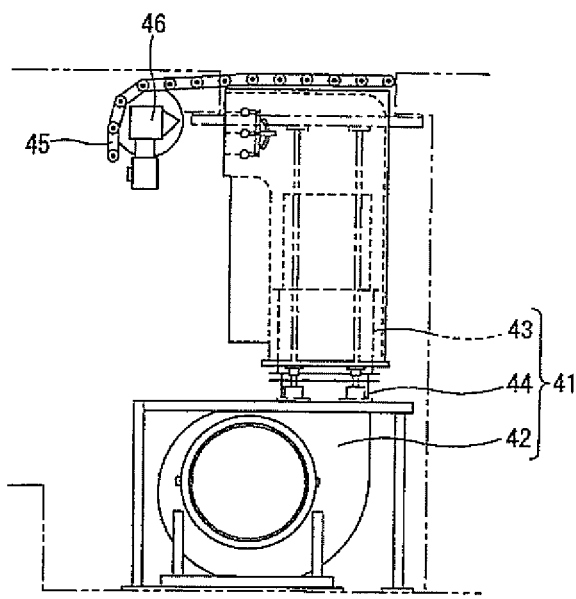
FIG. 7 is a side view of an essential part in a state in which a duct opening open/close plate is closed.
Figure 8:
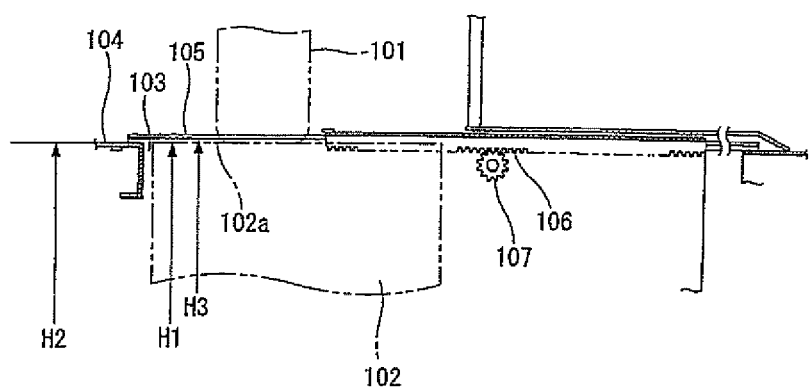
FIG. 8 is a sectional view of a conventional art.

REFERENCE SIGNS LIST 1, 1A . . . chassis dynamometer
2 . . . front-wheel roller

3 ... rear-wheel roller
4 ... rotation shaft
5 ... pit cover
6, 7 ... roller opening
8 ... roller ascent/descent operation mechanism
9 ... bed
10 ... inclined rail
11 ... bed driving section
12 ... motor
13 ... feed screw
14 ... feed nut
15 ... opening open/close mechanism
16 ... open/close plate
17 ... open/close plate driving section
18 ... open/close plate supporting guide
19 ... RF anechoic chamber
31 ... clamp mechanism
32 ... brake pad
33 ... brake plate
41 ... engine cooling device
42 ... engine cooling fan
43 ... ventilation duct
44 ... duct ascent/descent mechanism
45 ... duct opening open/close plate

The invention claimed is:

1. A chassis dynamometer comprising:
   a roller on which a wheel of a test vehicle is rested through a roller opening formed in a pit cover;
   a roller opening open/close mechanism that opens and closes the roller opening; and
   a roller ascent/descent operation mechanism that operates the roller to ascend and descend,
   wherein the roller opening open/close mechanism comprises a roller opening open/close plate that is overlaid on a side of a lower surface of the pit cover and operated to open and close the roller opening, an open/close plate driving section that moves the roller opening open/close plate to a roller opening closed position or a roller opening opened position, an open/close plate supporting guide that guides the roller opening open/close plate and supports the roller opening open/close plate in a height position of the pit cover in the roller opening closed position.

2. The chassis dynamometer as claimed in claim 1, further comprising:
   an engine cooling device comprising:
      an engine cooling fan disposed in a pit;
      a ventilation duct that introduces an air flow generated by the engine cooling fan into the test vehicle on the pit cover through a duct opening formed in the pit cover; and
      a duct ascent/descent mechanism that allows the ventilation duct to expand and retract, and ascend and descend; and
      a duct opening open/close plate that closes the duct opening in a state in which the ventilation duct is accommodated in the pit using the duct ascent/descent mechanism.

3. The chassis dynamometer as claimed in claim 1, wherein the roller ascent/descent operation mechanism comprises a bed on which the roller is mounted, an inclined rail that supports the bed such that the bed is ascendable and descendable, and a bed driving section that allows the bed to run along the inclined rail.

4. The chassis dynamometer as claimed in claim 3, wherein the bed driving section comprises a motor, a feed screw that is rotationally driven by the motor, and a feed nut that converts rotation of the feed screw into slide motion of the bed.

5. The chassis dynamometer as claimed in claim 4, wherein the roller ascent/descent operation mechanism comprises a clamp mechanism that fixes the bed on a side of the inclined rail.

6. The chassis dynamometer as claimed in claim 5, wherein the clamp mechanism comprises a brake pad disposed on one of the bed and the inclined rail, and a brake plate disposed on the other of the bed and the inclined rail, the brake pad being pressed against the brake plate.

7. The chassis dynamometer as claimed in claim 1, wherein the pit cover is provided with an RF anechoic chamber in a test vehicle introducing position in which the roller opening is located.

8. A method of opening and closing a roller opening of a chassis dynamometer using a roller on which a wheel of a test vehicle is rested through a roller opening formed in a pit cover, a roller opening open/close mechanism that opens and closes the roller opening by a roller opening open/close plate, and a roller ascent/descent operation mechanism that operates the roller to ascend and descend, the method comprising:
   overlaying the roller opening open/close plate on a side of a lower surface of the pit cover, and sliding the roller opening open/close plate to close the roller opening in a height position of the pit cover by the roller opening open/close plate; and
   upon using the roller, sliding the roller opening open/close plate to open the roller opening, and ascending the roller to the height position of the pit cover by the roller ascent/descent operation mechanism.

* * * * *